United States Patent
David et al.

(10) Patent No.: US 10,774,814 B2
(45) Date of Patent: Sep. 15, 2020

(54) SYSTEM AND METHOD FOR MONITORING BLADE DEFLECTION OF WIND TURBINES

(71) Applicants: Innergex Inc., Longueuil (CA); INSTITUT NATIONAL D'OPTIQUE, Quebec (CA)

(72) Inventors: Vincent David, Riviere-du-Loup (CA); Daniel Cantin, Ville de Québec (CA); Robert Guillemette, Shefford (CA); Jonathan Cloutier, Gaspe (CA)

(73) Assignees: INNERGEX INC., Longueuil (CA); INSTITUT NATIONAL D'OPTIQUE, Quebec (CA)

( * ) Notice: Subject to any disclaimer, the term of this patent is extended or adjusted under 35 U.S.C. 154(b) by 207 days.

(21) Appl. No.: 15/843,920

(22) Filed: Dec. 15, 2017

(65) Prior Publication Data
US 2018/0171984 A1    Jun. 21, 2018

Related U.S. Application Data

(60) Provisional application No. 62/435,189, filed on Dec. 16, 2016.

(51) Int. Cl.
*F03D 17/00* (2016.01)
*F03D 7/02* (2006.01)
(Continued)

(52) U.S. Cl.
CPC .......... *F03D 17/00* (2016.05); *F03D 7/0204* (2013.01); *F03D 7/0224* (2013.01);
(Continued)

(58) Field of Classification Search
CPC ...... F03D 17/00; F03D 7/0244; F03D 7/0224; F03D 7/0204; F03D 1/06; F03D 7/0288;
(Continued)

(56) References Cited

U.S. PATENT DOCUMENTS

| 7,059,822 B2 | 6/2006 | Lemieux et al. |
| 7,246,991 B2 | 7/2007 | Bosche |

(Continued)

FOREIGN PATENT DOCUMENTS

| EP | 2511523 | 10/2012 |
| EP | 3023635 | 5/2016 |
| EP | 3232051 | 10/2017 |

OTHER PUBLICATIONS

European Search report, dated Jul. 13, 2020, 9 pages.

*Primary Examiner* — Kenneth M Lo
*Assistant Examiner* — Mohammed Shafayet
(74) *Attorney, Agent, or Firm* — Benoit & Cote, Inc.; C. Marc Benoit

(57) ABSTRACT

Described is a system for monitoring deflection of turbine blades of a wind turbine comprising a tower. The system comprises a position detecting apparatus mounted to the wind turbine comprising a plurality of position detection components each collecting data regarding a field of detection through which a segment of the turbine blades passes, wherein the position detection components are monitoring distinct fields of detection to collect distances of a plurality of segments of each one of the turbine blades travelling through the fields of detection. The system further comprises a deflection controller configured to receive the collected distances and to determine deflection of the turbine blades accordingly. An associated method comprises collecting distances of a plurality of distinct segments of the turbine blades when the turbine blades travel within a plurality of fields of detections, and processing the collected distances to determine clearance between the turbine blades and the tower.

15 Claims, 8 Drawing Sheets

(51) Int. Cl.
*G05B 19/048* (2006.01)
*G05B 23/02* (2006.01)
*F03D 1/06* (2006.01)

(52) U.S. Cl.
CPC ......... *F03D 7/0244* (2013.01); *F03D 7/0288* (2013.01); *G05B 19/048* (2013.01); *F03D 1/06* (2013.01); *F05B 2240/302* (2013.01); *F05B 2240/912* (2013.01); *F05B 2270/17* (2013.01); *F05B 2270/33* (2013.01); *F05B 2270/804* (2013.01); *G05B 23/0289* (2013.01); *G05B 2219/2619* (2013.01); *Y02E 10/721* (2013.01); *Y02E 10/723* (2013.01); *Y02E 10/728* (2013.01)

(58) Field of Classification Search
CPC .......... G05B 19/048; G05B 2219/2619; G05B 23/0289; F05B 2270/804; F05B 2270/33; F05B 2240/912; F05B 2270/17; F05B 2240/302; Y02E 10/728; Y02E 10/723; Y02E 10/721
USPC ....................................................... 700/280
See application file for complete search history.

(56) References Cited

U.S. PATENT DOCUMENTS

| | | | |
|---|---|---|---|
| 8,131,402 B2 | 3/2012 | Neumann | |
| 9,000,970 B2 | 4/2015 | Anderson et al. | |
| 9,128,184 B1 | 9/2015 | Bachmann et al. | |
| 9,347,435 B2 | 5/2016 | Olesen et al. | |
| 2004/0057828 A1* | 3/2004 | Bosche | F03D 7/0204 416/1 |
| 2008/0101930 A1* | 5/2008 | Bosche | F03D 7/0204 416/31 |
| 2010/0063769 A1* | 3/2010 | Egedal | F03D 7/042 702/154 |
| 2010/0084864 A1 | 4/2010 | Lucks | |
| 2010/0253569 A1* | 10/2010 | Stiesdal | G01B 11/026 342/118 |
| 2011/0135466 A1* | 6/2011 | Latorre | F03D 7/02 416/1 |
| 2011/0144815 A1* | 6/2011 | Neumann | F03D 7/0288 700/287 |
| 2011/0150647 A1* | 6/2011 | Gierlich | F03D 17/00 416/1 |
| 2011/0205521 A1* | 8/2011 | Mimeault | G01S 7/4814 356/4.01 |
| 2012/0169053 A1* | 7/2012 | Tchoryk, Jr. | G01P 5/26 290/44 |
| 2012/0318057 A1* | 12/2012 | Olesen | G01P 5/20 73/170.06 |
| 2013/0189102 A1 | 7/2013 | Wedel-Heinen | |
| 2013/0194567 A1* | 8/2013 | Wan | G01B 11/14 356/152.1 |
| 2013/0272874 A1* | 10/2013 | Hess | F03D 7/0224 416/1 |
| 2013/0287567 A1* | 10/2013 | Olesen | F03D 7/0288 416/1 |
| 2013/0297085 A1* | 11/2013 | Xiongzhe | F03D 7/0276 700/287 |
| 2014/0030090 A1* | 1/2014 | Kammer | F03D 17/00 416/1 |
| 2015/0240787 A1 | 8/2015 | Byskov et al. | |
| 2015/0252789 A1 | 9/2015 | Bunge | |
| 2016/0146189 A1* | 5/2016 | Cook | F03D 7/047 416/1 |
| 2017/0090019 A1* | 3/2017 | Slobodyanyuk | G01S 7/4861 |
| 2017/0107976 A1 | 4/2017 | Enevoldsen et al. | |

* cited by examiner

SYSTEM AND METHOD FOR MONITORING BLADE DEFLECTION OF WIND TURBINES

CROSS-REFERENCE TO RELATED APPLICATION

This application claims priority from U.S. patent provisional application 62/435,189 filed Dec. 16, 2016, the specification of which is hereby incorporated herein by reference in its entirety.

BACKGROUND

(a) Field

The invention relates to an arrangement to monitor the deflection or bending of an object, preferably to monitor the deflection or bending of a wind-turbine blade.

(b) Related Prior Art

Blades of modern wind turbines are quite long; they may measure up to 88 meters long or even more. Thus, their shape and their characteristics need to be monitored in order to optimize their aerodynamic profile by adjusting the blade pitch angle, especially to prevent sudden change in loads that could cause damage to one or multiple blades either by reaching critical deflection or by hitting the tower while the wind turbine is in operation.

More specifically, the deflection or bending of the blade near its tip-end needs to be known to prevent those damages.

It is known to attach strain gauges on the blade-surface. They are mainly used for test purposes to gather a certain knowledge about the blade when it is stressed.

The installation of gauges and the installation of their electrical cabling needed are expensive, especially beside a wind turbine which is in operation. The equipment (especially the cabling) is exposed to lightning strikes, thus the gauges are mainly used for time-limited test purposes.

It is also known, as described in U.S. Pat. No. 9,000,970 B2, to use a system comprising a reflector arranged at a first position and an antenna-system arranged at a second position. The antenna system contains a transmit antenna and a receive antenna, while the reflector and the antenna-system are coupled by a radio signal. The radio signal is sent from the transmit antenna via the reflector towards the receive antenna. The receive antenna is connected with an evaluation unit, which is prepared to measure the deflection between the first end of the object and the second end of the object based on the received radio signal.

It is also known, as described in US patent publication 2011/0135466 A1, to use a system comprising a passive position detecting apparatus and a controller. The passive position detecting apparatus being configured to acquire and transmit data relating directly to a position of at least one of the turbine blades. The controller being configured to receive the data from the passive position detecting apparatus and compare such data to a known position reference to determine turbine blade deflection.

Other documents, such as European patent publication EP 2339173, U.S. Pat. Nos. 7,246,991 and 7,059,822, and US patent publication US2011/0134366 also aims to address that same problem, with limited successes.

Only a certain blade-deflection can be measured by these systems due to the location of the system-parts, the nature of the detection means, and other factors such as detection locations, etc. With most of them, only the deflection of the tip-end of the blade can be approximated. Most of them further require components on the blades. They are sensitive to weather. Thus, none of these solutions provides the desired level of precision nor provides the reliability to face all operating conditions of a wind turbine.

There is therefore a need for improvement in the field of wind turbine, and more precisely in the field of deflection monitoring of blades of wind turbines.

SUMMARY

According to an embodiment, there is disclosed a system for monitoring deflection of turbine blades of a wind turbine comprising a tower, wherein the turbine blades comprise segments along a length of the turbine blades, the system comprising: a position detecting apparatus mounted to the wind turbine, the position detection apparatus comprising position detection components each detecting a presence or absence of a corresponding one of the segments of the turbine blades; and a deflection controller configured to receive the presence or absence detection and to use the presence or absence detection to determine a distance of each of the segments of the turbine blades relative to the tower, whereby the distance of each of the segments of the turbine blades relative to the tower is representative of the deflection of the turbine blades.

According to an aspect, the position detection components comprise a pulsed laser source and a sensor.

According to an aspect, each one of the position detection components is set at a distinct angle relative to a horizontal plane.

According to an aspect, each one of the position detection components is associated with a distinct channel resulting in a plurality of colinear channels.

According to an aspect, a power ratio of a power associated with a first one of the position detection components over a power associated with a second one of the position detection components is above about 5 to 1.

According to an aspect, each of the position detection components are set to a spread angle, and wherein the spread angle associated with a first one of the position detection components is different from the spread angle associated with a second one of the position detection components.

According to an aspect, a spread angle ratio of the spread angle associated with the first one of the position detection components over a spread angle associated with the second one of the position detection components is above about 2 to 1.

According to an aspect, the wind turbine further comprises a nacelle and wherein the position detection apparatus is mounted under the nacelle.

According to an aspect, the system further comprises at least one of an inclinometer and an accelerometer; and wherein at least one of the inclinometer and accelerometer provides data regarding bending of the tower or inclination of the nacelle.

According to an aspect, the system further comprises a corrective system, wherein the deflection controller triggers actions to be performed by the corrective system upon detection of deflection of the turbine blades outside an acceptable range.

According to an aspect, the wind turbine comprise a nacelle mounted to the tower, a hub mounted to the nacelle, with the turbine blades mounted to the hub, wherein the corrective system is adapted to perform at least one of: altering pitch of at least one of the turbine blades; modifying blade load by modifying torque demand over the hub; modifying yawing of the nacelle; and applying a break on the hub.

According to an aspect, the position detecting apparatus further comprises a plurality of neighbor detection components each collecting data regarding a distinct lateral neighbor field of detection each corresponding to a distinct segment of rotation cycle of the turbine blades, whereby each of the neighbor detection components monitors a passage of blade tips of the turbine blades travelling through an associated distinct lateral neighbor field of detection at a distinct phase of a rotation cycle of the turbine blades.

According to an embodiment, there is disclosed system for monitoring deflection of turbine blades each having a blade tip of a wind turbine, the system comprising: a detecting apparatus mounted to the wind turbine distant from the turbine blades, the detection apparatus comprising a plurality of neighbor detection components each collecting data regarding a distinct lateral neighbor field of detection each corresponding to a distinct segment of rotation cycle of the turbine blades, whereby each of the neighbor detection components monitors a passage of the blade tips of the turbine blades travelling through an associated distinct lateral neighbor field of detection at a distinct phase of a rotation cycle of the turbine blades when the turbine blades feature a level of deflection over a predetermined level; and a deflection controller configured to receive the collected data and to determine a deflection condition of the turbine blades accordingly.

According to an aspect, the neighbor detection components comprise a pulsed laser source and a sensor.

According to an aspect, the distinct lateral neighbor fields of detections correspond to field of views of the neighbor detection components set at distinct angles relative to a vertical plane.

According to an embodiment, there is disclosed method of monitoring clearance between turbine blades and a tower of a wind turbine, wherein the turbine blades comprise segments along a length of the turbine blades, the method comprising: detecting, using a position detecting apparatus mounted to the wind turbine distant from the turbine blades, presence or absence of a corresponding one of the segments of the turbine blades; and processing the detected presence or absence detection to determine a distance of each of the segments of the turbine blades relative to the tower, whereby the distance of each of the segments of the turbine blades relative to the tower is representative of the clearance of the turbine blades.

According to an aspect, the method further comprises at least one of: detecting an angular position of the turbine blades; associating detected presences or absences with a specific one of the turbine blades; and detecting anomalies associated with one of the turbine blades relative to the tower.

According to an aspect, the method further comprises detecting at least one of inclination data and proper acceleration data, wherein the step of processing further comprises processing the at least one of inclination data and proper acceleration data.

According to an aspect, the method further comprises receiving data extrinsic to the wind turbine, wherein the step of processing further comprises establishing parameters based at least on the extrinsic data.

According to an aspect, the step of processing further comprises comparing the clearance with parameters, and wherein the method further comprises:

identifying a faulty condition based on comparison of the clearance with the parameters; and
triggering corrective actions to prevent the turbine blades to hit the tower.

According to an aspect, implementations may comprise one or more of the following features.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
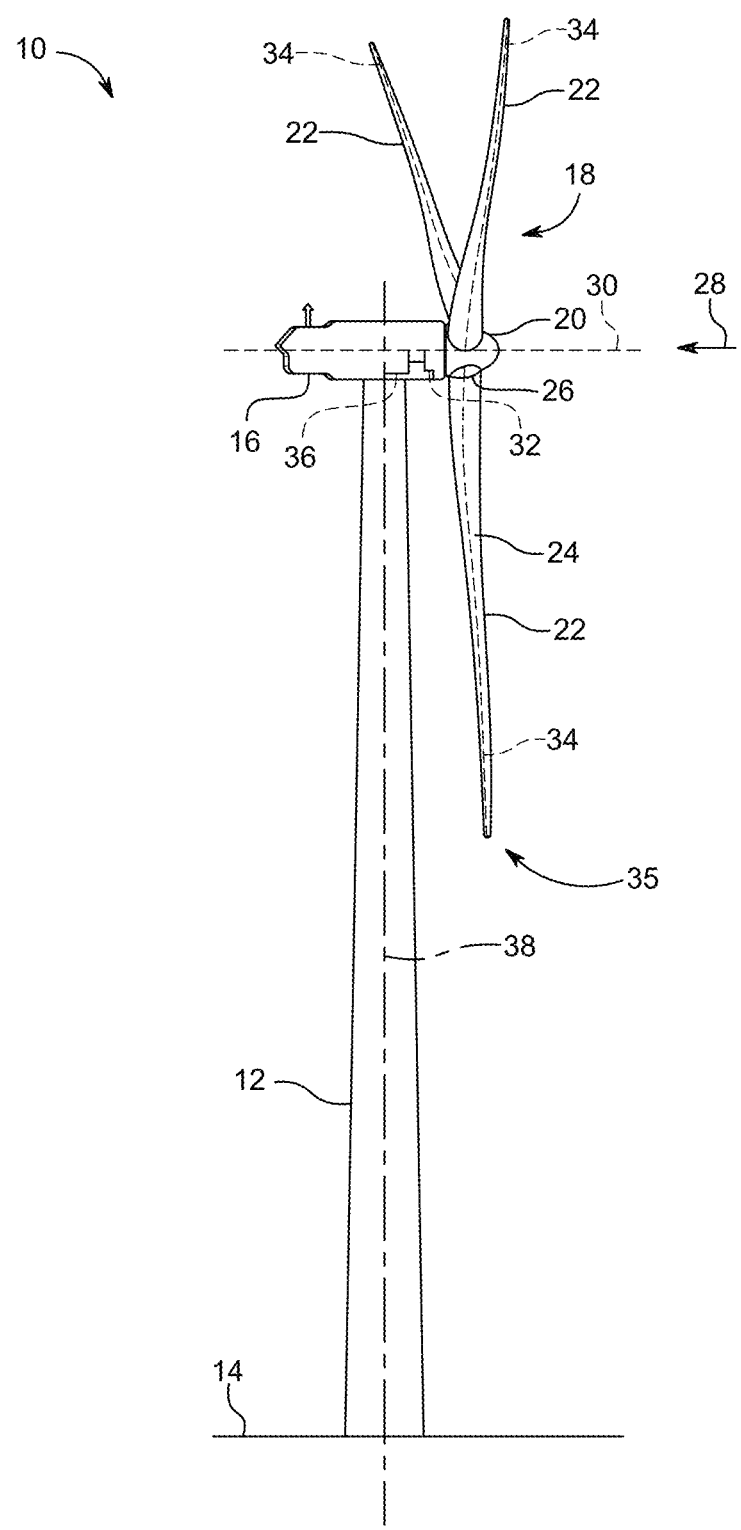
FIG. 1 is a side view of a wind turbine in accordance with an embodiment.

Reference now will be made in detail to embodiments of the present subject matter, one or more examples of which are illustrated in the drawings. Each example is provided by way of explanation, without limiting the scope of the present subject matter. In fact, it will be apparent to those skilled in the art that various modifications and variations can be made in the present subject matter without departing from its scope or spirit. For instance, features illustrated or described as part of one embodiment can be used with another embodiment to yield a still further embodiment. Thus, it is intended that the present subject matter covers such modifications and variations as come within the scope of the appended claims and their equivalents.

FIG. 1 illustrates a perspective view of a wind turbine 10. As shown, the wind turbine 10 is a horizontal-axis wind turbine. The wind turbine 10 comprises a tower 12 (or a post) that extends from a base 14, a nacelle 16 mounted on the tower 12, and a rotor 18 that is coupled to the nacelle 16. The rotor 18 comprises a rotatable hub 20 and usually at least three turbine blades 22 coupled to and extending outward from the hub 20. As shown, the rotor 18 comprises three turbine blades 22. However, in an alternative embodiment, the rotor 18 may comprise more (or less) than three turbine blades 22. Additionally, in the illustrated embodiment, the tower 12 is fabricated from tubular steel to define a longitudinal cavity (not illustrated) between the base 14 and the nacelle 16. In an alternative embodiment, the tower 12 may be any suitable type of tower having any suitable height.

The turbine blades 22 may generally have any suitable length extending from their mounting part the hub 20 to the blade tip 35 that enables the wind turbine 10 to operate as described herein. For example, in one embodiment, the turbine blades 22 may have a length ranging from about 15 meters to about 88 meters. However, other non-limiting examples of blade lengths may comprise 10 meters or less, 20 meters, 37 meters or a length that is greater than 88 meters. For teaching purposes, the example of wind turbine 10 herein described will be of turbine blades 22 of 37 meters.

Additionally, the turbine blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not shown) positioned within the nacelle 16 to permit electrical energy to be produced. Further, the turbine blades 22 may be mated to the hub 20 by coupling a blade root portion 24 to the hub 20 at a plurality of load transfer regions 26. Thus, any loads induced to the turbine blades 22 are transferred to the hub 20 via the load transfer regions 26.

As shown in the illustrated embodiment, the wind turbine 10 may also comprise a turbine control system or turbine controller 36 located within the nacelle 16 or within the tower 12. However, it should be appreciated that the turbine controller 36 may be disposed at any location on or in the wind turbine 10, at any location on the base 14 or generally at any other location communicatively linked to the wind turbine 10. The turbine controller 36 may also be divided into a plurality of components divided between a plurality of locations, the components of the turbine controller 36 being communicatively linked and ensuring operation of the wind turbine 10. The turbine controller 36 may be configured to control the various operating modes of the wind turbine 10 (e.g. start-up and shut-down conditions and sequences). Additionally, the turbine controller 36 may be configured to control a pitch angle or blade pitch of each of the turbine blades 22 relative to the wind direction 28 to control the load and power generated by the wind turbine 10 by adjusting an angular position of at least one turbine blade 22 relative to the wind. For instance, the turbine controller 36 may control the blade pitch of the turbine blades 22, either individually or simultaneously, by signalling a pitch adjustment system 32 adapted to perform the operation. Pitch axes 34 for the turbine blades 22 are shown. Further, as the wind direction 28 changes, the turbine controller 36 may be configured to control a yaw direction of the nacelle 16 about a yaw axis 38 to position the turbine blades 22 with respect to the wind direction 28. For example, the turbine controller 36 may signal a yaw drive mechanism (not shown) of the nacelle 16 in order for the latter to rotate the nacelle 16 about the yaw axis 38.

Figure 4C:
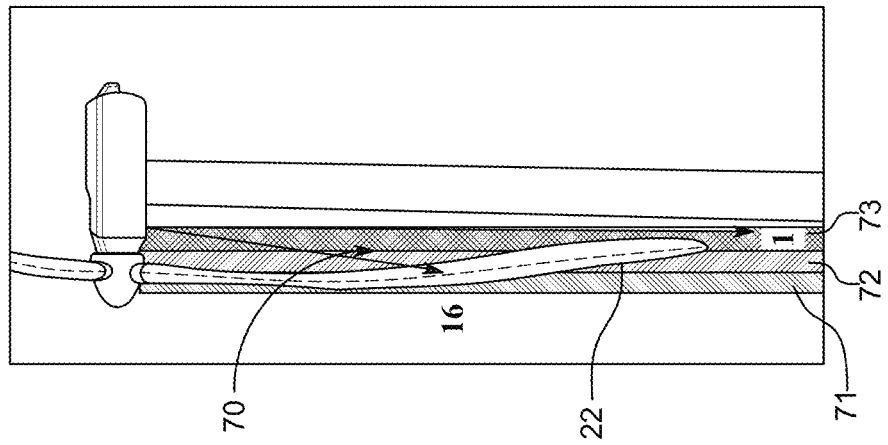
FIGS. 4A to 4C are schematic side views of a wind turbine and wind blade deflections according to three deflection levels.
Figure 4B:
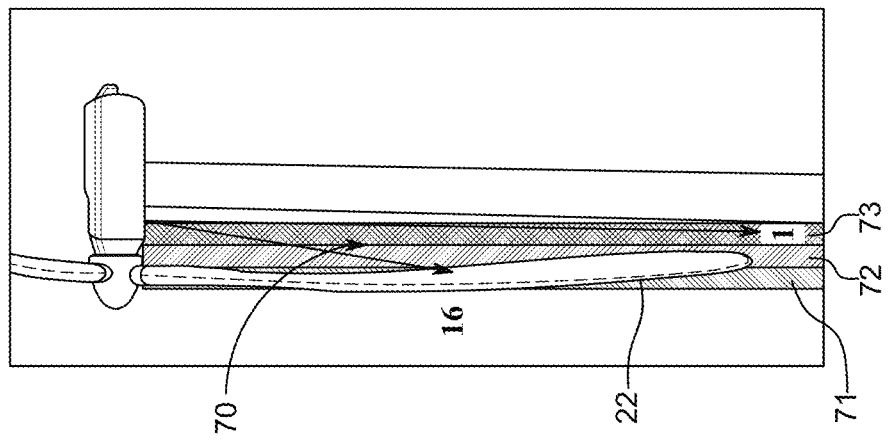
Figure 4A:
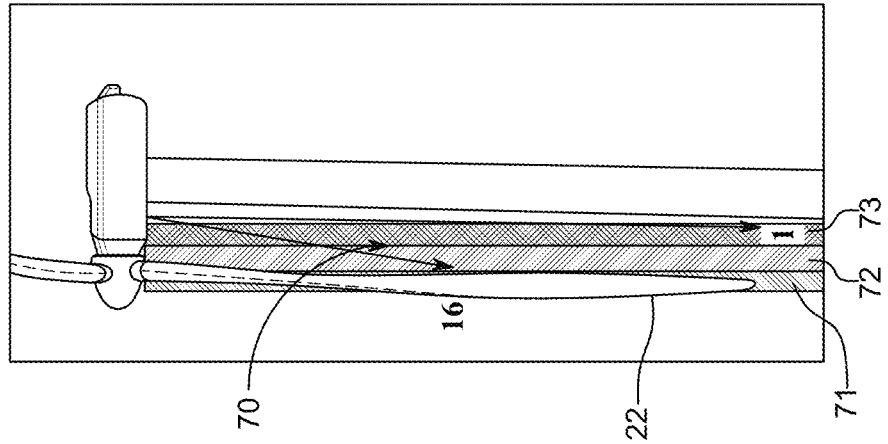

During operation of the wind turbine 10, wind strikes the turbine blades 22 from a wind direction 28, which causes the rotor 18 to rotate about an axis of rotation 30 and to define a virtual rotation disk (see FIGS. 4A-4C: a space occupied by the turbine blades 22 as they rotate. As the turbine blades 22 are rotating and subjected to centrifugal forces, the turbine blades 22 are also subjected to various forces and bending moments. As such, the turbine blades 22, and therefore the rotation disk, may deflect from a neutral, or non-deflected, position, hence from a flat rotation disk, to a deflected position, hence a domed rotation disk. The non-deflected blade clearance represents the distance between the turbine blades 22 when in front of the tower 12 (hence a portion of the inner face of the rotation disk) and the tower 12 when the turbine blades 22 are in a non-deflected position. However, forces and bending moments acting on the turbine blades 22 may cause the turbine blades 22 to deflect towards the tower 12, reducing the overall blade clearance, especially close to the tip of the turbine blades 22. As aerodynamic loads increase, excessive forces and bending moments can cause deformation of the rotation disk and therefore of one or more sections of the turbine blades 22, specifically the tip, and cause one or more of the turbine blades 22 to strike the tower 12 resulting in significant damage and downtime.

Figure 2:
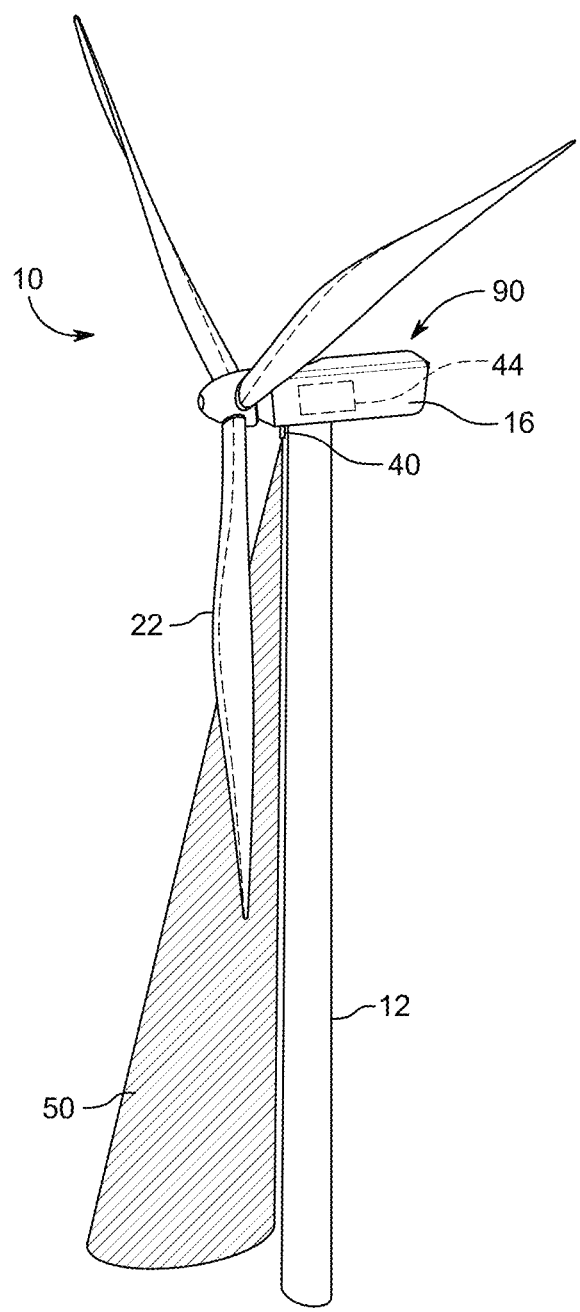
FIG. 2 is a perspective view of a wind turbine showing detection area associated with the position detection apparatus in accordance with an embodiment.

FIG. 2 illustrates an embodiment of a system for monitoring the blade deflection of turbine blades 22 of a wind turbine 10 as mounted to a wind turbine 10 under the nacelle 16. The system comprises a position detecting apparatus 40 and a deflection controller 44 (herein illustrated as mounted somewhere in the nacelle 16). The position detecting apparatus 40 is configured to acquire data, comprising a plurality of distances, relating directly to the position of a turbine blade 22 traveling relatively in front of the tower 12, in a detection area 50, and to transmit the data to the deflection controller 44. The deflection controller 44 is configured to receive the data from the position detecting apparatus 40 and to process the data to determine the deflection of the turbine blades 22, hence deflection of the rotation disk and blade clearance, as will be described in greater detail below. As indicated above, the position detecting apparatus 40 is configured to acquire data, namely distances and/or presence, of a turbine blade 22 when it is located in a detection area relatively in front of the tower 12.

It should be readily appreciated that the position detecting apparatus 40 does not require any component in or on the turbine blade 22, and therefore can be installed on existing wind turbines 10. The position detecting apparatus 40 acquires data relating directly to the position of a turbine blade 22 with such existing wind turbines 10 without requiring modification of the turbine blades 22 of the wind turbine 10. Furthermore, as will be discussed herein, the position detecting apparatus 40 is adapted to efficiently and reliably operate in variable weather conditions, including rain, snow, fog, clouds, etc.

Back to FIG. 2, the wind turbine 10 comprises a position detecting apparatus 40 comprising a plurality of position detection components 42 (see FIG. 3) directed at least partially at a section of the rotation disk, and more specifically the section substantially in front of the tower 12.

More specifically, each one of the position detection component 42 consists in a LiDAR (Light Detection and Ranging) component adapted to monitor thus detect the presence and the distance to an object, namely a turbine blade 22, within a distinct field of detection along a precise orientation, and to collect distances. Thus, LiDAR must be understood as a surveying or scanning method and/or device that measures distance to a target by illuminating that target with a pulsed laser light, and measuring the reflected pulses with a sensor. In consequence, a LiDAR device comprises a light source (component illuminating the target) and a sensor (measuring the reflected pulses).

In the present case, seventeen (17) such LiDARs are mounted together as distinct position detection components 42 and are directed at different angles toward the rotation disk to collect distance data. The angles are selected, as illustrated on FIG. 2, to detect distance of segments along the length of a turbine blade 22 from a position relatively close to the rotatable hub 20 (e.g., a location close to two third of the turbine blade length from the hub 20) to an angle wherein reading of a distance/presence of the tip of a turbine blade 22 only occurs when the turbine blade 22 presents at least a predetermined level of deflection. The angles may be defined so as to generate a relatively continuous vertical spread detection area extending from the first angle to the second angle relative to a horizontal plane. According to an embodiment, the segments are distinct and separated from each other.

In another embodiment, the position detecting apparatus 40, based on above described use of a multichannel LiDAR, would not provide a sufficient ranging distance capability within the time of passage of the blade tip 35 in its field of view or field of detection. This might result from the power of the light source from the detecting apparatus 40 being distributed over a large area, or field of view, or field of detection. In this case, different position detecting apparatus 40, or LiDARs, having distinct fields of views (a.k.a. fields of detection), are combined. Therefore, a first mono-component position detecting apparatus 40, a.k.a. mono-channel LiDAR, is used to detect a minimum deflection level of the blade tip 35 at a specific position with respect to a distance from the tower 12. This first mono-component position detecting apparatus 40 preferably has a smaller field of view and a more powerful light source to perform measurement of the position of the turbine blade 22 of farther distances. Then, an additional position detecting apparatus 40, with one or multiple detection components 42, such as a mono-channel LiDAR or a multichannel LiDAR, is used to assess the maximum deflection of the blade tip 35 from the measured distances read at other angles and providing positions of the turbine blade 22 along its length closer to the hub 20. The position of the blade tip 35 with respect to the tower 12 is obtained from extrapolation of the shape of the turbine blade 22 measured at different points along the turbine blade 22. The other position detecting apparatus 40, thus the other position detecting components 42, detects the position of the turbine blade 22 at shorter distance, or distances, than the first mono-component position detecting apparatus 40. Accordingly, this distance, or these distances, can be obtained even if the light source is distributed over a larger area than the area covered by the first mono-component position detecting apparatus 40.

It is noted that the angle for channel 17 of the LiDAR is closer to a horizontal plane and channel 1 of the LiDAR is closer to a vertical plan. Furthermore, according to an embodiment, the channels 1 to 17 are colinear.

The distances measured from the position detecting components 42 of the first position detecting apparatus 40 and the additional position detecting apparatus 42 are processed together to get a better assessment of the position of the blade tip 35, and thus distance of the blade tip 35 with respect to the tower 12.

LiDAR technology, and more specifically multichannel LiDARs, features advantageous characteristics for use in the present context. Since the turbine blades 22 are spinning, the speed of a section of a turbine blade 22 increases as distance of the segment of a turbine blade 22 relatively to the axis of rotation 30 increases. The LiDAR, with a data collection frequency of between 50 Hertz and 100 Hertz, is able to collect data both from a segment of a turbine blade 22 close to the axis of rotation 30 and from a segment close to the blade tip 35. Further, since the surface of the detection area associated with a LiDAR increases as the distance of the detected object increases, the detection area which crosses the tip of the turbine blade 22 is wider than the detection area which crosses another segment of the turbine blade 22 closer to the rotatable hub 20. Therefore, a turbine blade 22 has a longer path to travel to cross completely the detection area at the blade tip 35, which allows correct detection in spite of the higher speed of the blade tip 35.

According to an embodiment, the system comprises at least one position detecting apparatus 40 mounted on a turbine blade 22 close to the rotatable hub 20. The position detection components 42 of the turbine-blade mounted position detecting apparatus 40 are directed at least partially and generally toward the tower 12 and the ground to be able to detect deflection of the blade tip 35 of the turbine blade 22 on which is mounted the position detecting apparatus 40. Such measurement is performed by measuring/detecting the tower 12 and/or the blade tip 35 of the turbine blade 22 depending on the position detection component 42. According to an embodiment, the system comprises a position detecting apparatus 40 per turbine blade 22.

Figure 3:
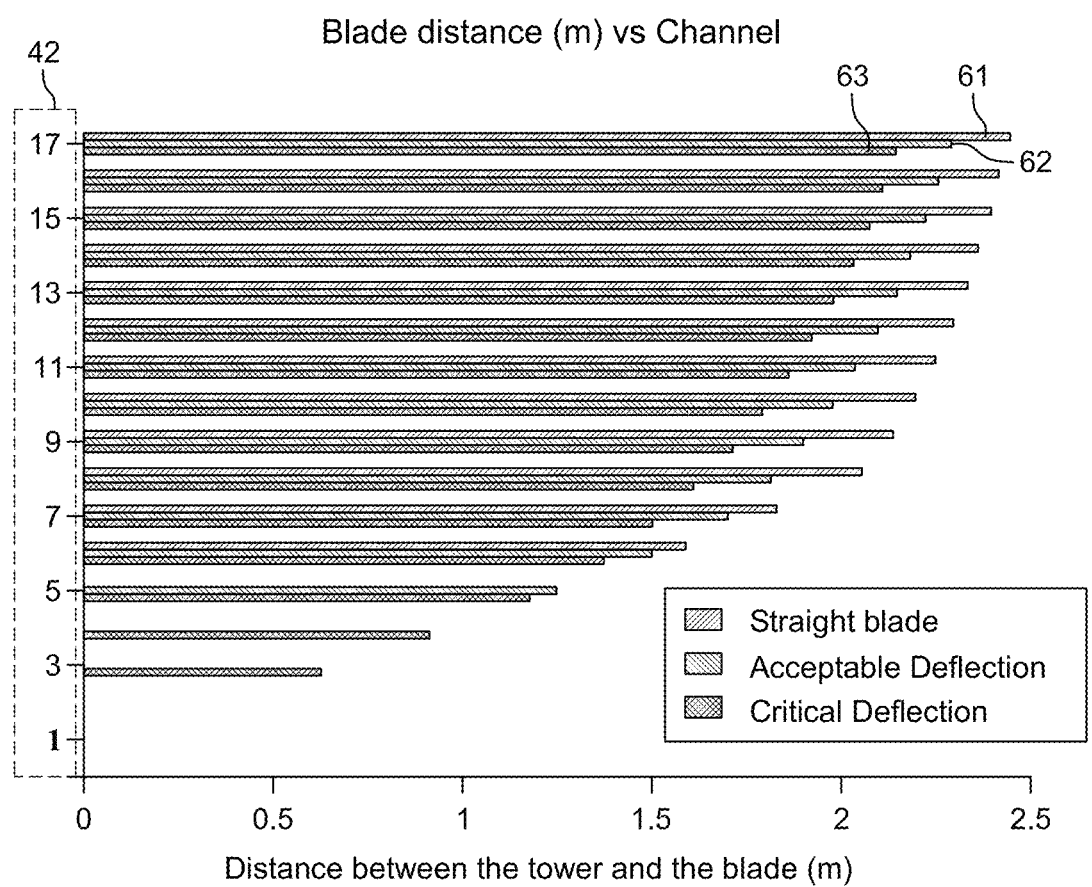
FIG. 3 is a chart illustrating blade clearance data resulting from processing of data collected by the position detection apparatus according to three deflection levels.

Regarding FIG. 3, a graph illustrates blade clearance calculated from the data collected by the different position detection components 42 of embodiments mounted under the nacelle 16 comprising either one or more position detecting apparatus 40. References from 1 to 17 are associated with distinct position detection components 42. The top line 61 indicates the blade clearance computed based on the distance read by the position detection component 42 when the turbine blades 22 undergo no deflection. The middle line 62 indicates the blade clearance computed based on the distances read by the position detection components 42 when the turbine blades 22 undergo deflection within an acceptable range. The bottom line 63 indicates the blade clearance computed based on the distances read by the position detection components 42 when the turbine blades 22 undergo deflection above an acceptable range (i.e., critical).

It must be noted that the position detection components 42 associated with references 1 to 5 read no distances in a no deflection condition (no top line 61). As blade deflection increases, the distances read by the position detection components 42 of associated references 17 to 6 decrease. Gradually, the position detection components 42 of associated references 5 to 3 become capable of capturing distance data of a segment of the turbine blades 22 as the turbine blades 22 deflect and appear in the field of view, hence the associated detection area, of these position detection components 42. It must be noted that the data provided in FIG. 3 are not distance data as read by the position detection components 42, but rather calculated blade clearance between a corresponding segment of the turbine blade 22 and the tower 12 based on distance data collected by the position detection components 42 and formula based on angles, known position of the corresponding detection area segments and tower segments.

The rotation disk 70 in different conditions is further illustrated on FIGS. 4A-C. For illustration, FIG. 3—lines 61-63 and FIG. 4A show the position detection components 42 of references 17 to 6 providing data in any conditions, namely when the rotation disk 70 shows no deformation (area 71), when the rotation disk 70 shows deformation within an acceptable range of deformation (area 72) and when the rotation disk 70 shows deformation above the acceptable range of deformation (area 73). FIG. 3—lines 62-63 and FIG. 4B show additional position detection components 42 providing data only when the rotation disk 70 is showing deformation within an acceptable range of deformation (the rotation disk 70 having entered the area 72). FIG. 3—lines 63 and FIG. 4C show further position detection components 42 providing data when deflection of the turbine blades 22 result in the rotation disk 70 showing deformation above the acceptable range of deformation (the rotation disk 70 having entered area 73), and thus the turbine blades 22 being in dangerous conditions.

Accordingly, as explained in relation with the position detection components 42 associated with references 1 to 5 on FIG. 3, according to an embodiment, the position detection components 42 collect Boolean data, namely whether or not a portion of the detection area is crossed by a section of a turbine blade 22 being or close to the blade tip 35. According to that embodiment, based on the identification and angles of the different position detection components 42 which provide positive data, the deflection controller 44 is able to determine a level of deflection of the turbine blades 22, a.k.a. a level of deformation of the rotation disk 70. According to an embodiment, comparison of the data collected by the position detection component 42 allows to establish validity of the collected data and to determine an actual range of deflection of the turbine blades 22.

Figure 5C:
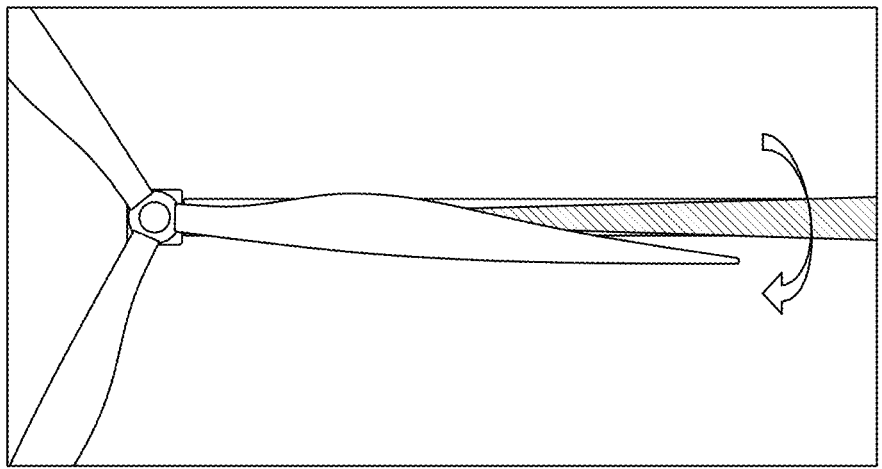
FIGS. 5A to 5C are schematic front views of the wind turbine and the detection area in accordance with an embodiment and interaction of a turbine blade with the detection area while crossing it.
Figure 5B:
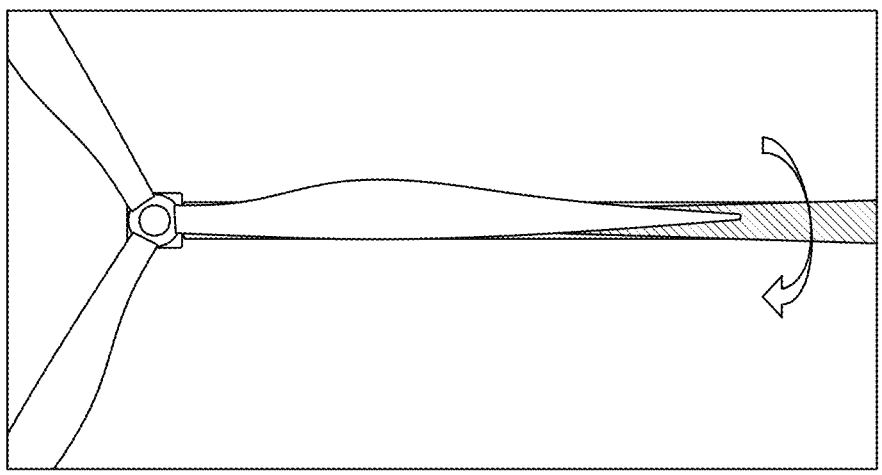
Figure 5A:
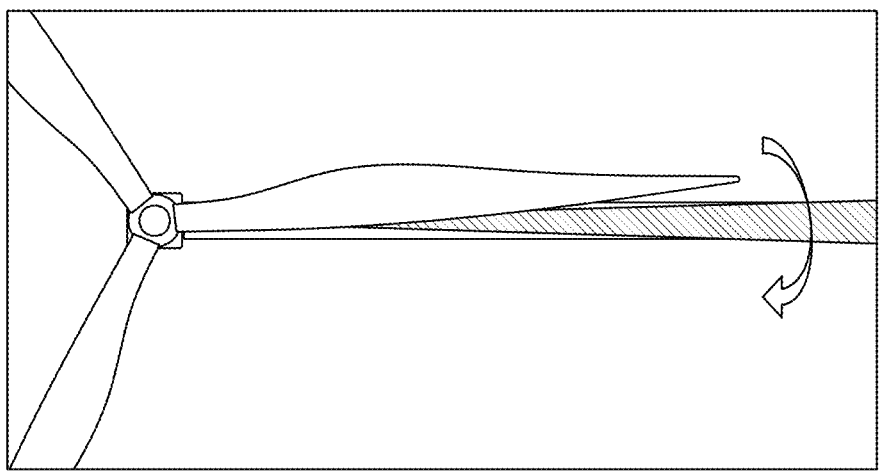

According to an embodiment, as illustrated on FIGS. 5A-C, the position detection components 42, additionally to being spread in different vertical angles relative to a vertical plane, is spread horizontally to cover a wider angle, for example about 3 degrees. Accordingly, with this embodiment a turbine blade 22 takes longer to cross completely the 3-degree detection area, providing more time for one or more position detection components 42 to collect distance data. Therefore, that configuration ensures that at least a portion of the position detection components 42 having detection area segments associated therewith that are close to the blade tip 35 would be able to collect distance data at each passage of a turbine blade 22, and that regardless of the speed at which the blade tip 35 travels across the detection area.

According to an embodiment, a plurality of position detection components 42 are spread in multiple channels horizontally, such as to have one channel aligned in front of the turbine tower 12 while another channel pointing at a position where the turbine blade 22 is not yet in front of the tower 12 and/or another channel pointing at a position wherein the turbine blade 22 has passed the tower 12. Therefore, that configuration provides information on some local deflection effect that can occur when the turbine blade 22 passes in front of the tower 12. This effect is known to happen from aerodynamic acceleration of air that is deviated and accelerated when passing around the tower 12. The supplemental deflection effect can be measured by comparing the distance measured when the turbine blade 22 passes in front of the tower 12 with the distance measured when the position of the turbine blade 22 is not in front of the tower 12.

Furthermore, this configuration described in the above embodiment can be combined with other configurations in order to get information of the overall shape of deflection of the turbine blade 22 in front of the tower 12 as well as the dynamic, or temporal, blade deflection changes that are occurring in the vicinity of the tower 12.

According to an embodiment, a blade deflection measurement per turbine blade 22 is performed and individually associated with the turbine blades 22 in a processing manner. According to an embodiment, the wind turbine 10 comprises a blade position detection means, such as means to measure the angle of rotatable hub 20 with set angles individually associated with each of the turbine blades 22, an individual measurement of the orientation of the turbine blades 22, close-field or optical detection means comprising in combination a detector and identification components located on the turbine blades 22 with the detector detecting and identifying the turbine blade 22, hence turbine blade position, when the turbine blade 22 is passing in front of the detector, etc. The blade position detection means is communicatively linked to the deflection controller 44 to signal position and/or identification of a turbine blade 22 to associate with deflection collection data. The deflection controller 44 further determines individually the deflection of each of the turbine blades 22 and may trigger individually for each of the turbine blades 22 correction(s) (e.g. altering the blade pitch) based on their individual associated collected data. It can be used to identify structural weaknesses of a specific turbine blade 22. Furthermore, that embodiment provides a solution to detect system failure through comparison of blade detection data by the position detecting apparatus 40 to intended data (e.g. when one turbine blade 22 passes in the detection area, thus when data is intended to be acquired by the position detecting apparatus 40).

According to such an embodiment, FIGS. 4A-C may illustrate the level of deflection of three turbine blades 22 of the same wind turbine 10 during the same rotation cycle. For instance, based on actual configurations (e.g. pitch angle) and structural weaknesses, the three turbine blades 22 may present different levels of deflection, including as illustrated having them in distinct deflection levels 71, 72, 73 of the rotation disk 70, thus in three distinct current operating conditions.

According to an embodiment, the position detecting apparatus 40 is mounted under the nacelle 16 to be protected, or partially shielded, from bad weather (snow, rain, etc.) by the nacelle 16. The detection position apparatus is further mounted to the nacelle 16, close to the tower 12 (hence away from the turbine blades 22) to have an optimum viewing angle of the turbine blades 22 and therefore extend the angle of detection. According to other embodiments, the position detecting apparatus 40 is mounted to the nacelle 16, either on top or on the side of the nacelle 16.

According to embodiments, the system, embedded in the position detection apparatus 40 or in the nacelle 16, comprises an inclinometer 82 (see FIGS. 6A-C) providing inclination data, and an accelerometer 84 (see FIGS. 6A-C) providing proper acceleration data.

Figure 6C:
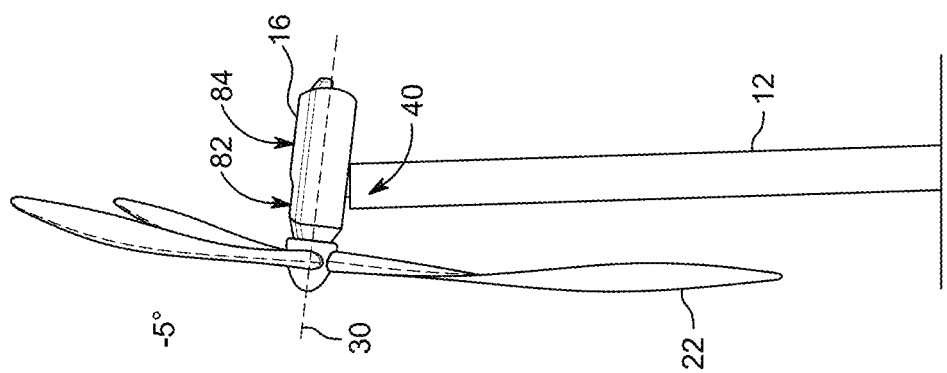
FIGS. 6A to 6C are schematic side views of the wind turbine in accordance with an embodiment in distinct conditions of inclination of the nacelle of the wind turbine.
Figure 6B:
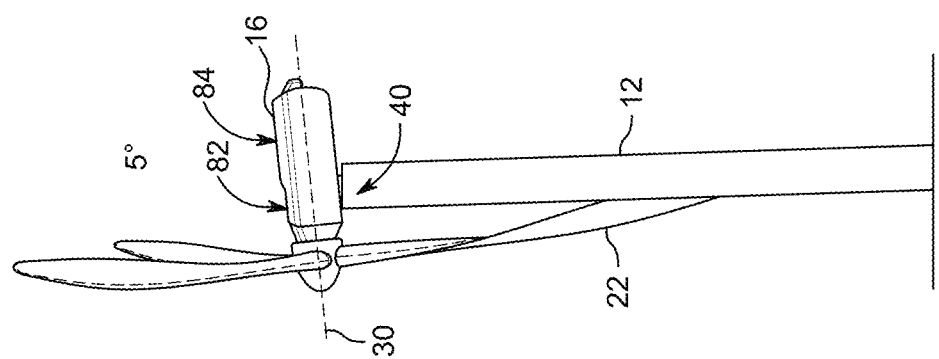
Figure 6A:
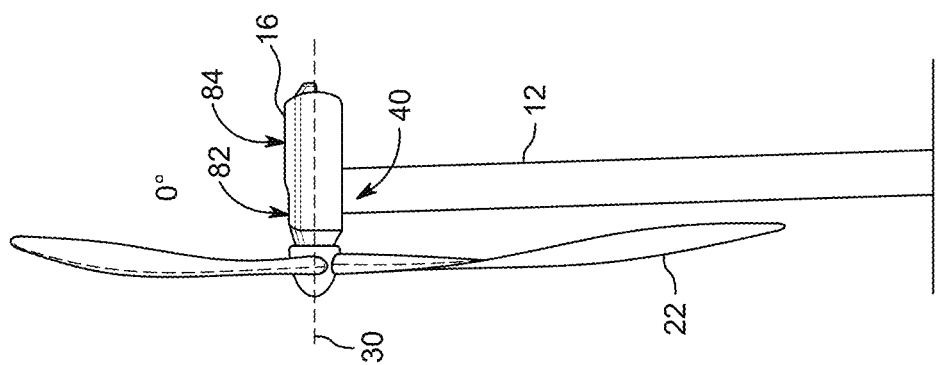

Some of the proposed embodiments are intended to get information on the relative position of the blade tip 35 with respect to the turbine tower 12 to prevent collision between them, and thus prevent related costs. Configurations that use position detecting apparatus 40 mounted to the hub 20 or nacelle 16 in these cases, not only need the deflection measured of the turbine blades 22, but also need to take into account possible inclination of the hub 20 or nacelle 16 with respect to the tower 12. It is known that towers 12 are designed to bend under high wind speed (source: Nicholson, John Corbett. "Design of wind turbine tower and foundation systems: optimization approach." MS (Master of Science) thesis, University of Iowa, 2011. http://ir.uiowa.edu/etd/1042) to prevent mechanical fatigue or to avoid very large infrastructure that would be required to prevent such bending. In this case, an inclinometer 82 and an accelerometer 84 can be used nearby the position detecting apparatus 40 to assess the extent of the bending of the tower 12 and also the relative displacement of the nacelle 16, or hub 20, with respect to the position of the tower 12 where the blade tip 35 can hit it. The information provided by the accelerometer 84 and inclinometer 82 can then be used to assess the distance from the blade tip 35 to the tower 12 by using some models for the tower bending. An example of the impact of the inclination of the nacelle 16 on the clearance between the blade tips 35 and the tower 12 is illustrated on FIGS. 6A-C, with FIG. 6A illustrating the nacelle 16 at its nominal inclination level, a.k.a. zero-degree angle. In this case, while the turbine blade 22 is deflected, there is not in contact of the blade tip 35 with the tower 12. FIG. 6B illustrates the nacelle 16 inclined forward, a.k.a. toward the tower 12, and displays a turbine blade 22 that would hit the tower 12. Finally, FIG. 6C illustrates the nacelle 16 inclined backward and thus having a greater clearance between the turbine blade tip 35 and the tower 12. These schematic representations do not reflect the real life, since the tower 12 bending is not represented, but they illustrate the effect of the inclination of the nacelle 16 on the clearance between the turbine blade tip 35 and the tower 12.

Regarding the detection directions of the position detection apparatus 40, according to embodiments, the position detecting apparatus 40 is mounted to the turbine blade 22 as above described, to the rotatable hub 20, or to the tower 12, with the position detection components 42 being directed in a suitable manner according to the mounting location of the position detecting apparatus 40 to have either the turbine blades 22 or the tower 12 directed thereto.

According to embodiments, the position detecting apparatus 40 is protected from bad weather conditions by a weather-proof enclosure (not shown) housing it. The weather-proof enclosure is mounted in an appropriate fashion and provides suitable window(s) for the position detection components 42 to be directed suitably in an operational fashion.

According to an embodiment, the deflection controller 44 is mounted inside the nacelle 16, with the deflection controller 44 and the position detecting apparatus 40 communicatively linked therewith. That mounting configuration of the deflection controller 44 protects the deflection controller 44 from bad weather conditions while ensuring communication with the position detecting apparatus 40.

According to embodiments, inclinometer(s) 82 and/or accelerometer(s) 84 is/are mounted to position detecting apparatus 40, the nacelle 16 and/or the hub 20. The inclinometer(s) 82 is/are mounted in an operable fashion to provide at least one of: inclination of the position detecting apparatus 40, inclination of the nacelle 16 and inclination of the hub 20. The accelerometer(s) 84 is/are mounted in an operable fashion to provide at least one of: proper acceleration data relative to the tower 12, proper acceleration data relative to the nacelle 16, proper acceleration data relative to the hub 20, and proper acceleration data relative to the turbine blades 22. The inclinometer(s) 82 and/or accelerometer(s) 84 is/are communicatively linked with the deflection controller 44.

According to an embodiment, the power levels associated with each of the position detection components 42 are non-uniform. More precisely, the power level assigned to a position detection component 42 detecting a segment close to the rotatable hub 20 is lower than the power level assigned to a position detection component 42 (of references 5 to 1) associated with a detection area segment closer to the blade tip 35, or to the blade tip 35 of the turbine blades 22 in any deflection condition or in a deflected condition. The setting of the power levels to be assigned, according to an embodiment, involves a different number of LEDs (Light Emitting Diodes), or laser diodes, powering the different position detection components 42. According to an embodiment, the power ratio between two position detection components 42 would be above about 5 to 1. According to an embodiment, the power ratio between two position detection components 42 would be above about 10 to 1. According to another embodiment, the power ratio between two position detection components 42 would be above about 20 to 1. According to yet another embodiment, the power ratio between two position detection components 42 would be above about 30 to 1.

According to an embodiment, the width of the detection area, hence the detection spread angle of a position detection component 42 would be non-uniform. More precisely, the detection spread angle of the position detection component 42 oriented to detect a segment of a turbine blade 22 close to the rotatable hub 20 would have in a lower value than the detection spread angle of a position detection component 42 (of references 5 to 1) oriented to detect a segment closer to the blade tip 35, or the blade tip 35 of the turbine blades 22 in any deflection condition or in a deflected condition. According to an embodiment, the detection spread angle ratio between two position detection components 42 would be above about 2 to 1. According to another embodiment, the detection spread angle ratio between two position detection components 42 would be above about 5 to 1. According to yet another embodiment, the detection spread angle ratio between two position detection components 42 would be above about 10 to 1.

As a practical example of a realization and as illustrated on FIGS. 5A-C, a turbine blade 22 of 37 meters in length spinning at 20 rotations per minute would cross a set detection area of about 2 meters in width (with the set horizontal detection angle being about 3 degrees) at the blade tip 35 in about 18 to 24 msec. The collection frequency of a LiDAR (50 to 100 Hertz) would collect data every about 10 to 20 msec. Thus, the parameters, and particularly the set horizontal detection angle, would ensure that the position detection component 42 is able to collect distance data at probably every spin of the wind turbine 10.

In other embodiments, the horizontal detection angle may be set wider or narrower, having an impact on the power level set to a position detection component 42 and the probability of detection of a turbine blade 22 at every passage.

In an embodiment, by setting "neighbor" position detection components 42 associated with neighbor detection area segments, a.k.a. fields of detection, at about side-by-side horizontal detection angles, a wider detection area covering a plurality of segments of the rotation cycle of the turbine blades 22 is defined ensuring that at least one of the "neighbor" position detection components 42 detects and collects distance data of a section of (or close to) the high-speed blade tip 35 of the turbine blade 22 at each one of its passages through the neighboring fields of detection. FIGS. 5a-c illustrates a width a field of detection that is associated with a plurality of "neighbor" position detection components 42 (not shown on the figure), thus covering distinct segments, a.k.a. degrees of an arc, of the rotation cycle of the turbine blades 22. The "neighbor" position detection components 42 are detecting the blade tip 35 of the turbine blades 22 at different time, thus at different phases of the rotation of the turbine blades 22.

In case of very bad weather conditions that would reduce the visibility such as fog, snow, heavy rain, and cloud, the accuracy of the distance or deflection measurements could be affected more significantly at the blade tip 35 of the turbine blade 22 than with segments of the turbine blades 22 near the rotatable hub 20. Hence, the deflection measurements obtained at all angles in good visibility conditions could be used as a mean to get a calibration of deflections. Also, full waveform LiDAR have the advantage to provide information on the weather conditions that prevail during measurements. The visibility being reduced by the presence of light scattering particles (water droplets or snowflakes) will also appear on the LiDAR signal at distances in between the LiDAR module under the nacelle 16 and the turbine blade 22. Thus, the presence of such signal above a certain threshold could trigger a mode in the deflection controller 44 that will take the effect of the bad visibility conditions into account. In this case, the calibration performed in good visibility conditions could then be used to extrapolate the resulting deflection at the blade tip 35 of the turbine blade 22 in bad visibility conditions from measurements performed at angles closer to the rotatable hub 20. This way the deflection controller 44 will provide relevant information that could otherwise be compromised by severe weather conditions.

It must be noted that while camera systems (even standard active imaging systems such as surveillance video systems) are subject to being affected severely in bad visibility conditions such as rain, snow, fog, clouds, full waveform LiDARs are much more robust operation-wise. This comes from the increased processing possibilities that can be implemented from the complete LiDAR signal over time. This allows to discriminate light returned by solid targets such as turbine blades 22 from more diffuse "pollution" targets such as fog and cloud.

While the embodiment described above is making use of LiDAR technology, other similar technologies such as RADAR and LEDDAR™ (e.g. LiDAR based on Light Emitting Diodes) could be used.

Practical applications of the system for monitoring of the deflection of turbine blades 22 of a wind turbine 10 may include integration in a corrective system 90 and/or security system (not shown).

According to an embodiment, the system for monitoring the deflection of turbine blades 22 is configured to trigger a corrective action from the corrective system 90 in order to reduce or stop blade deflection. For example, the deflection controller 44 may be communicatively linked to a system configured to perform a corrective action preventatively, such as by making a one-time parameter change, in anticipation of operating conditions that may present an increased likelihood of a tower strike. Alternatively, the deflection controller 44 may be configured to trigger a corrective action reactively in response to blade deflection of one or more of the turbine blades 22 that exceeds a predetermined blade deflection threshold. Regardless, the corrective action may allow a wind turbine 10 to be adaptable to varying operating conditions which may otherwise result in significant aerodynamic loading on the turbine blades 22. Thus, the deflection controller 44 may be configured to trigger a corrective action to safeguard against the risk of tower strikes or other blade damage due to excessive turbine blade deflection.

The extent or magnitude of blade deflection required for the deflection controller 44 to trigger a corrective action reactively may vary from wind turbine to wind turbine. For example, the predetermined blade deflection threshold may depend on the operating conditions of the wind turbine 10, the thickness of the turbine blades 22, the length of the turbine blades 22 and numerous other factors. For example, the predetermined blade deflection threshold of a turbine blade 22 may be equal to a predetermined percentage of the non-deflected blade clearance. In the event that the deflection controller 44 determines that the turbine blade deflection has exceeded this threshold, it can trigger a corrective action to safeguard against a tower strike. As another example, there may be another threshold related to the change of the blade deflection with time that would be indicative of strong wind bursts building up and that could prevent proper assessment of blade deflection on an instantaneous basis to implement corrective action in fast enough time to safeguard against a tower strike. In the event that the deflection controller 44 determines that the turbine blade deflection change over time has exceeded this other threshold, it can trigger a corrective action to safeguard against a tower strike. In another embodiment, differences in measured deflection between different blades is used by the deflection controller 44 as a threshold to trigger possible diagnostic of a specific blade structural defect and to operate the wind turbine 10 with operating parameters that will prevent the defective turbine blade 22 to hit the tower 12 or the blade structural defect to deteriorate.

The corrective actions triggered by the deflection controller 44 may take many forms.

In an embodiment, the triggered corrective action comprises altering the blade pitch of one or more turbine blades 22 for a partial or full revolution of the rotor 18. As indicated above, this may be accomplished by signalling a pitch adjustment system 32. Generally, altering the blade pitch of a turbine blade 22 reduces blade deflection by increasing out-of-plane stiffness.

In an embodiment, the triggered corrective action comprises modifying the blade load on the wind turbine 10 by either increasing or decreasing the torque demand on the electrical generator (not illustrated) positioned within the nacelle 16. This modification of the load demand would result in a modification of the rotational speed of the turbine blades 22, thereby modifying, and potentially as intended reducing the aerodynamic loads acting upon the surfaces of the turbine blades 22.

In an embodiment, the triggered corrective action comprises yawing the nacelle 16 to change the angle of the nacelle 16 relative to the wind direction 28 (see FIG. 1). A yaw drive mechanism (not shown) is typically used to change the angle of the nacelle 16 so that the turbine blades 22 are properly angled with respect to the prevailing wind. For example, pointing the leading edge of a turbine blade 22 upwind can reduce loading on the turbine blade 22 as it passes the tower 12.

In an embodiment, the triggered corrective action comprises applying a mechanical break to the rotatable hub 20 to stop the rotation of the turbine blades 22; that solution is only selected in exceptional conditions. This corrective action is usually, if not always, associated with one of the other above correction actions.

It should be readily appreciated, however, that the deflection controller 44 needs to be communicatively linked, directly or indirectly, to one such system able to perform the corrective actions described above and may generally trigger any corrective action designed to reduce blade deflection. Additionally, the deflection controller 44 may be configured to trigger multiple corrective actions simultaneously or in sequence, which may comprise one or more of the corrective actions described above.

Furthermore, the deflection controller 44 may be configured to trigger a particular corrective action in response to certain operating conditions and/or operating states of the wind turbine 10. Thus, in one embodiment, the deflection controller 44 may be configured to selectively trigger a particular corrective action depending upon intrinsic parameters (turbine blade deflection data) and extrinsic parameters transmitted by other components and/or systems (wind speed, turbine blade speed, current load, etc.). For example, during certain wind conditions, turbine blade deflection may be most effectively reduced by altering the blade pitch of the turbine blades 22. Accordingly, during such conditions, the deflection controller 44 may be configured to receive extrinsic parameters (wind speed data), to determine the best response based on these parameters, and to trigger alteration of the blade pitch of one or more of the turbine blades 22 when the determined blade deflection exceeds a predetermined threshold, such as a predetermined percentage of the non-deflected blade clearance. However, in the event that blade deflection is below this predetermined threshold, data processing by the deflection controller 44 may result in triggering a different corrective action. This may be desirable, for example, when an alternative corrective action can sufficiently reduce blade deflection while causing less of an impact on the amount of power generated by the wind turbine 10. Accordingly, such a configuration can improve the efficiency of a wind turbine 10 by ensuring that the corrective action performed is proportional to the severity of the blade deflection.

Figure 7:
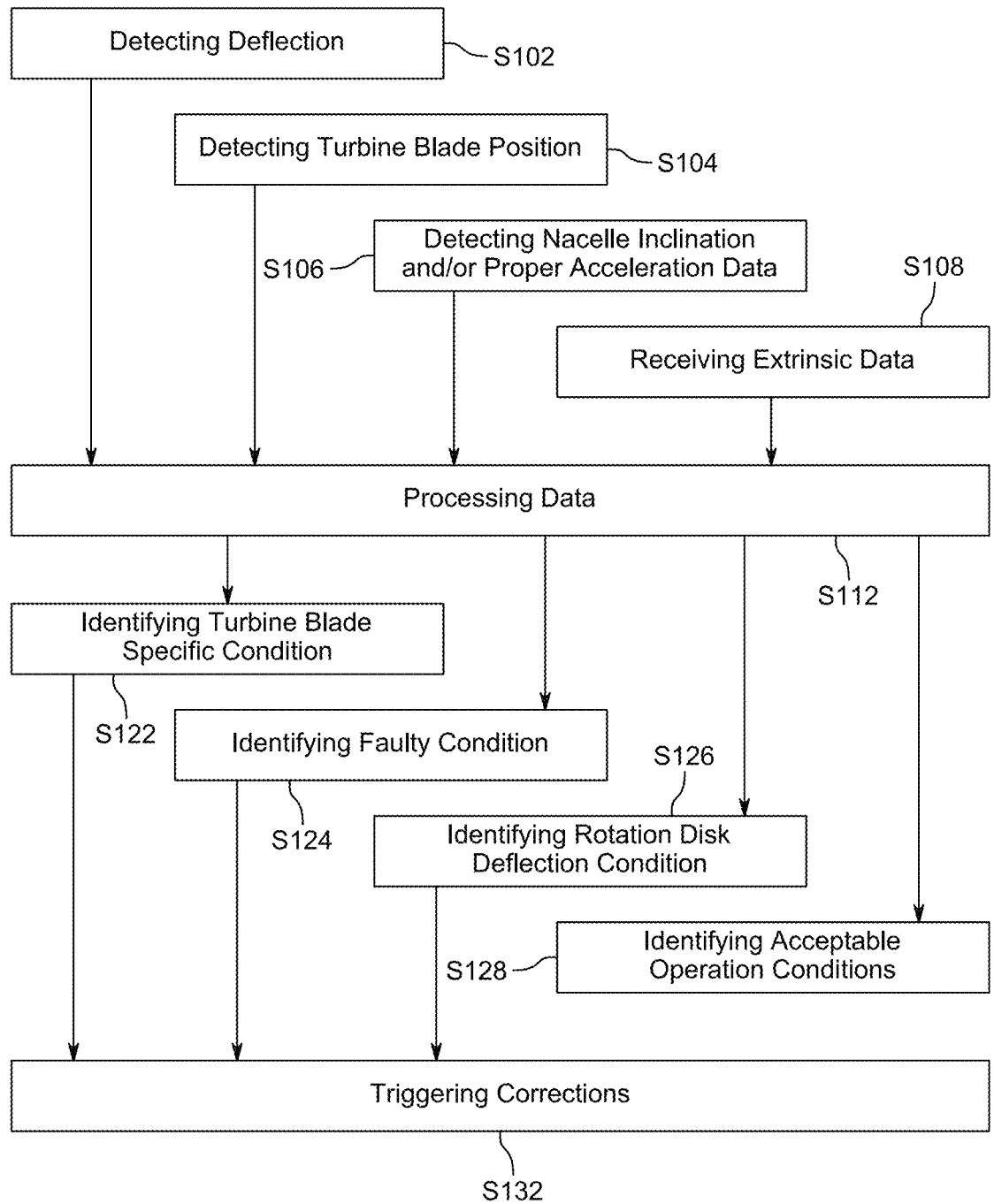
FIG. 7 is a flow chart provided steps performed according to an embodiment of the system and FIG. 8 is a flow chart depicting steps of a method of monitoring clearance between the turbine blades and the tower of a wind turbine in accordance with an embodiment.
Figure 8:
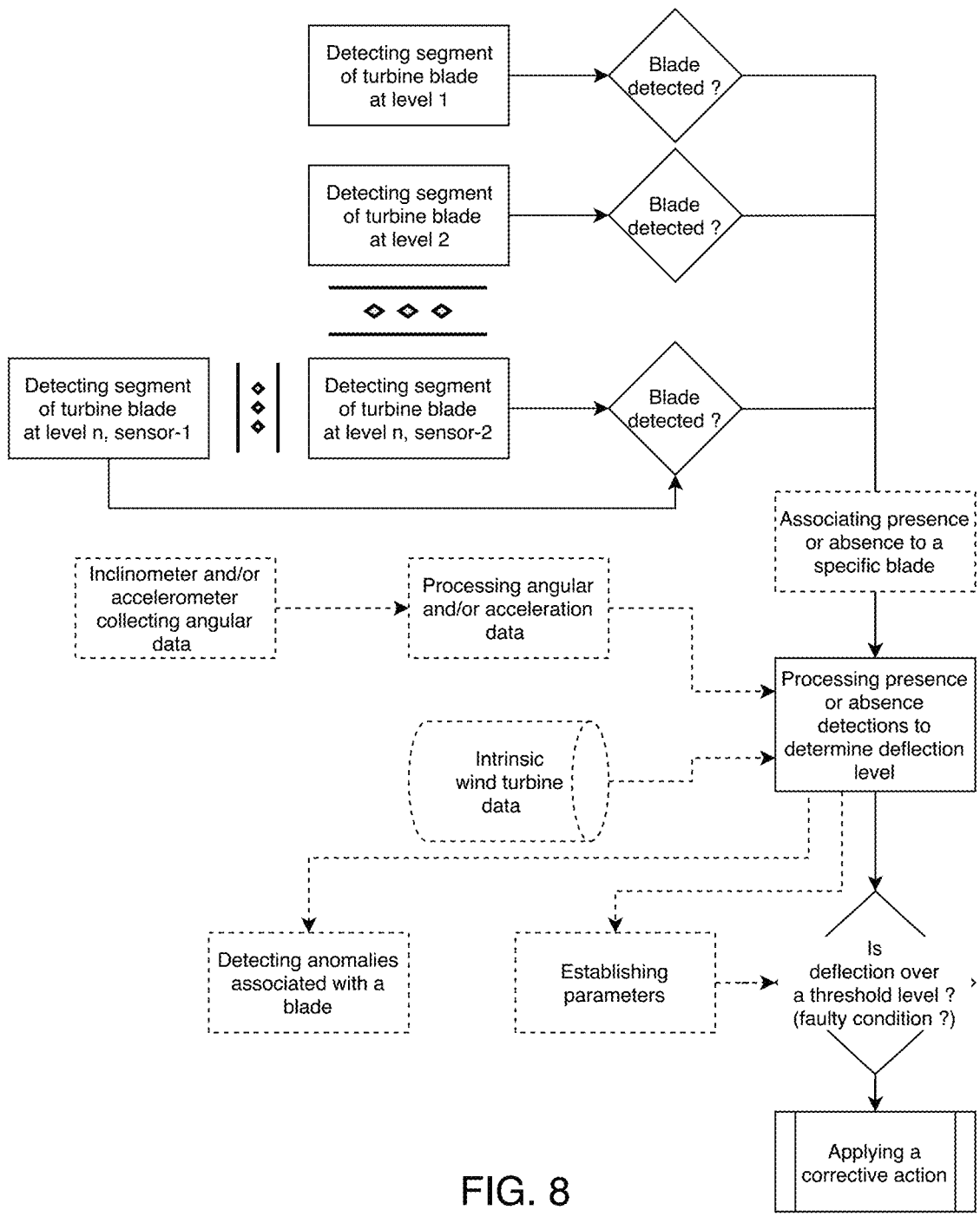

Referring to FIG. 7, a method of operation comprises the following steps:

At step S102, the system is configured to detect deflection data as turbine blades pass in the detection area, and to transmit deflection data to the deflection controller.

At step S104, the system may be configured to detect position, presence and/or identification of a turbine blade that passes in the detection area. The data is transmitted, when such components are present, in real time or close to real time to the deflection controller. The latter may thus associate the turbine blade identification with the deflection data.

At step S106, the system may be configured to collect inclination data and/or proper acceleration data that provides information on at least one of the inclination of the nacelle or the hub, movements of the nacelle or the hub, and bending or movements of the tower. The data is transmitted, when such components are present, in real time or close to real time to the deflection controller. The latter may thus process changes in the intrinsic environmental conditions (angle of the anchoring of the turbine blades, vibration in the components, and bending of the tower) for these intrinsic environmental conditions to be taken into account in the processing of the clearance between the turbine blades and the tower.

At step S108, the system may be configured to receive extrinsic data, such as wind speed data, to be processed with the identified data transmitted at steps S102, S104 and S106.

At step S112, the system processes the received data and determine a current operating condition based both or either of a) received data and presence of particular data associated with specific deflection levels of the turbine blades, and b) processing the received data and potentially comparing the received data with parameters.

Determining a current operating condition in the present step means determining if the wind turbine is currently, or based on last data received by the deflection controller, in acceptable operating conditions, a.k.a. if the rotation disk, and thus the turbine blades are within the acceptable range of deformation, or not. The determination of the current operating conditions is used to determine if, when and what corrective action(s) must be triggered.

Processing the presence of some data may include determining fault associated with some detection means, hence lack of signal, or detecting deflection signal that is associated with a turbine blade being deflected of at least a predetermined percentage, as illustrated through FIG. 3, FIGS. 4A-C and FIGS. 6A-C.

Processing the received data may comprise comparing the deflection data to the blade position data to single out turbine blade weakness, comparing deflection data of distinct turbine blades to monitor rotation disk deformation, and comparing deflection data of the turbine blades over a plurality of cycles to detect data variation that may be due, for instance, to vibrations.

Processing the received data and comparing the received data with parameters may comprise, as illustrated through FIG. 3, FIGS. 4A-C and FIGS. 6A-C the comparison of the received data, or of the clearance determined based on the received data, to pre-set operation parameters such as deflection percentages.

At step S122, the method may comprise, based on the result of the processing of the collected data, identifying a condition, such as a percentage of deflection, specific to an identified turbine blade.

At step S124, the method may comprise, based on the result of the processing of the collected data, identifying a condition, such as a) malfunction of a detector, b) weather condition preventing the system to operate adequately, specific to a component of the system, and c) communication problems between components of the system for example.

At step S126, the method may comprise, based on the result of the processing of the collected data, identifying a condition, such as general level of deflection, that applies to the rotation disk, hence to the turbine blades.

At step S128, the method may comprise, based on the result of the processing of the collected data, identifying that the wind turbine operates in acceptable conditions. Such conclusion may be regularly registered for maintenance purposes.

At step S132, the method may comprise to trigger one of the available corrective actions above discussed. The determination of the corrective action(s) to trigger is based on a corrective algorithm taking into account a series of parameters such as the determined current operating conditions, the severity of the identified current operating conditions, the size and configuration of the wind turbine, the components of the system, the components of the wind turbine, a corrective history, raw data from which result the determination of the current operating conditions, etc. Such a corrective action may include operative actions (such as changes in the pitch angle) and non-operative actions (such as signals transmitted to a maintenance central).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for monitoring deflection of turbine blades of a wind turbine comprising a tower, wherein the turbine blades comprise segments along a length of the turbine blades, the system comprising:
   a position detection apparatus mounted to the wind turbine, the position detection apparatus comprising position detection components each detecting a presence or absence of a corresponding one of the segments of the turbine blades; and
   a deflection controller configured to receive the presence or absence detection and to use the presence or absence detection to determine a distance of each of the segments of the turbine blades relative to the tower, whereby the distance of each of the segments of the turbine blades relative to the tower is representative of the deflection of the turbine blades, wherein a power ratio of a power associated with a first one of the position detection components over a power associated with a second one of the position detection components is above 5 to 1.

2. The system of claim 1, wherein the position detection components comprise a pulsed laser source and a sensor.

3. The system of claim 1, wherein each one of the position detection components is set at a distinct angle relative to a horizontal plane.

4. The system of claim 1, wherein each one of the position detection components is associated with a distinct channel resulting in a plurality of colinear channels.

5. The system of claim 1, wherein the wind turbine further comprises a nacelle and wherein the position detection apparatus is mounted under the nacelle.

6. The system of claim 5, further comprising at least one of an inclinometer and an accelerometer; and wherein at least one of the inclinometer and accelerometer provides data regarding bending of the tower or inclination of the nacelle.

7. The system of claim 1, further comprising a corrective system, wherein the deflection controller triggers actions to be performed by the corrective system upon detection of deflection of the turbine blades outside an acceptable range.

8. The system of claim 7, wherein the wind turbine comprise a nacelle mounted to the tower, a hub mounted to the nacelle, with the turbine blades mounted to the hub, wherein the corrective system is adapted to perform at least one of:
    altering pitch of at least one of the turbine blades;
    modifying blade load by modifying torque demand over the hub;
    modifying yawing of the nacelle; and
    applying a break on the hub.

9. The system of claim 1, wherein the position detection apparatus further comprises a plurality of neighbor detection components each collecting data regarding a distinct lateral neighbor field of detection each corresponding to a distinct segment of rotation cycle of the turbine blades, whereby each of the neighbor detection components monitors a passage of blade tips of the turbine blades travelling through an associated distinct lateral neighbor field of detection at a distinct phase of a rotation cycle of the turbine blades.

10. A method of monitoring clearance between turbine blades and a tower of a wind turbine, wherein the turbine blades comprise segments along a length of the turbine blades, the method comprising:
    using a position detection apparatus mounted to the wind turbine distant from the turbine blades and comprising position detection components each detecting presence or absence of a corresponding one of the segments of the turbine blades; and
    processing the detected presence or absence detection to determine a distance of each of the segments of the turbine blades relative to the tower, whereby the distance of each of the segments of the turbine blades relative to the tower is representative of the clearance of the turbine blades, wherein a power ratio of a power associated with a first one of the position detection components over a power associated with a second one of the position detection components is above 5 to 1.

11. The method of claim 10, further comprising at least one of:
    detecting an angular position of the turbine blades;
    associating detected presences or absences with a specific one of the turbine blades; and
    detecting anomalies associated with one of the turbine blades relative to the tower.

12. The method of claim 10, further comprising detecting at least one of inclination data and proper acceleration data, wherein the step of processing further comprises processing the at least one of inclination data and proper acceleration data.

13. The method of claim 10, further comprising receiving data extrinsic to the wind turbine, wherein the step of processing further comprises establishing parameters based at least on the extrinsic data.

14. The method of claim 10, wherein the step of processing further comprises comparing the clearance with parameters, and wherein the method further comprises:
    identifying a faulty condition based on comparison of the clearance with the parameters; and
    triggering corrective actions to prevent the turbine blades to hit the tower.

15. A system for monitoring deflection of turbine blades of a wind turbine comprising a tower, wherein the turbine blades comprise segments along a length of the turbine blades, the system comprising:
    a position detection apparatus mounted to the wind turbine, the position detection apparatus comprising position detection components each detecting a presence or absence of a corresponding one of the segments of the turbine blades; and
    a deflection controller configured to receive the presence or absence detection and to use the presence or absence detection to determine a distance of each of the segments of the turbine blades relative to the tower, whereby the distance of each of the segments of the turbine blades relative to the tower is representative of the deflection of the turbine blades,
    wherein each of the position detection components are set to a spread angle, and wherein the spread angle associated with a first one of the position detection components is different from the spread angle associated with a second one of the position detection components,
    wherein a spread angle ratio of the spread angle associated with the first one of the position detection components over a spread angle associated with the second one of the position detection components is above 2 to 1.

* * * * *